United States Patent [19]

Barnhill

[11] Patent Number: 4,468,862

[45] Date of Patent: Sep. 4, 1984

[54] FOOTBALL STENCIL

[76] Inventor: W. David Barnhill, P.O. Box 1053, Tifton, Ga. 31794

[21] Appl. No.: 427,909

[22] Filed: Sep. 29, 1982

[51] Int. Cl.³ ........................ B43L 13/20; G09B 15/06

[52] U.S. Cl. ........................ 33/174 B; 434/251

[58] Field of Search ................ 33/174 B; 434/87, 251; 273/55 R, 94; D19/40

[56] References Cited

U.S. PATENT DOCUMENTS

| | | | |
|---|---|---|---|
| D. 137,905 | 5/1944 | Kardux | 33/174 B |
| 1,617,362 | 2/1927 | Wylie et al. | 434/251 |
| 2,131,825 | 10/1938 | Sultzer | 273/94 R |
| 2,149,325 | 5/1937 | White | 434/251 |
| 2,163,978 | 4/1937 | Ivanek | 434/251 |
| 2,371,485 | 3/1945 | Waldman | 33/174 B |
| 2,946,134 | 7/1960 | Neilson | 434/251 |
| 3,119,188 | 1/1964 | Orndorff | 33/174 B |
| 3,160,155 | 12/1964 | Bragg et al. | 33/174 B |
| 3,313,045 | 6/1964 | Cummins | 434/251 |
| 3,560,092 | 7/1968 | Coney | 434/251 |
| 3,760,520 | 9/1973 | Hamilton | 434/251 |
| 4,047,308 | 9/1977 | Wheeler | 434/251 |

*Primary Examiner*—Richard R. Stearns

[57] ABSTRACT

Offensive football formations at the beginning of plays can be accurately drawn on paper by the use of a unitary flat template having an array of apertures therein representative of all usual offensive players in their correct positions. By using a writing instrument in selected apertures, various offensive formations can be drawn with eleven players properly positioned to start offensive plays. Upon removal of the stencil from the paper, the execution of plays to completion can be conveniently diagramed. The device is ideal for use in the construction of team playbooks.

7 Claims, 2 Drawing Figures

FOOTBALL STENCIL

BACKGROUND OF THE INVENTION

The objective of this invention is to satisfy a need for a simple and practical device to assist coaches or other athletic instructors in the graphic illustration of offensive football team formations in accurate scale at the beginning of offensive plays.

Generally, rather haphazard means are employed to accomplish the diagraming of football formations, such as clipboards having sheets of paper thereon on which a coach, by freehand drawing, designates the positions and relationships of offensive players at the beginning of plays. The graphic results are not to proper scale and the entire procedure is inaccurate and not completely satisfactory.

Some prior art devices for generally similar purposes are known but, generally speaking, these devices are not satisfactory for the purposes of this invention due to being too complicated and costly or because they do not possess the required flexibility of use for illustating a wide variety of offensive formations.

Another object of the invention is to provide a simple device to assist coaches in diagraming offensive footabll plays to completion in team playbooks.

Other features and advantages of the invention will become apparent during the course of the following description.

DETAILED DESCRIPTION

Figure 1:
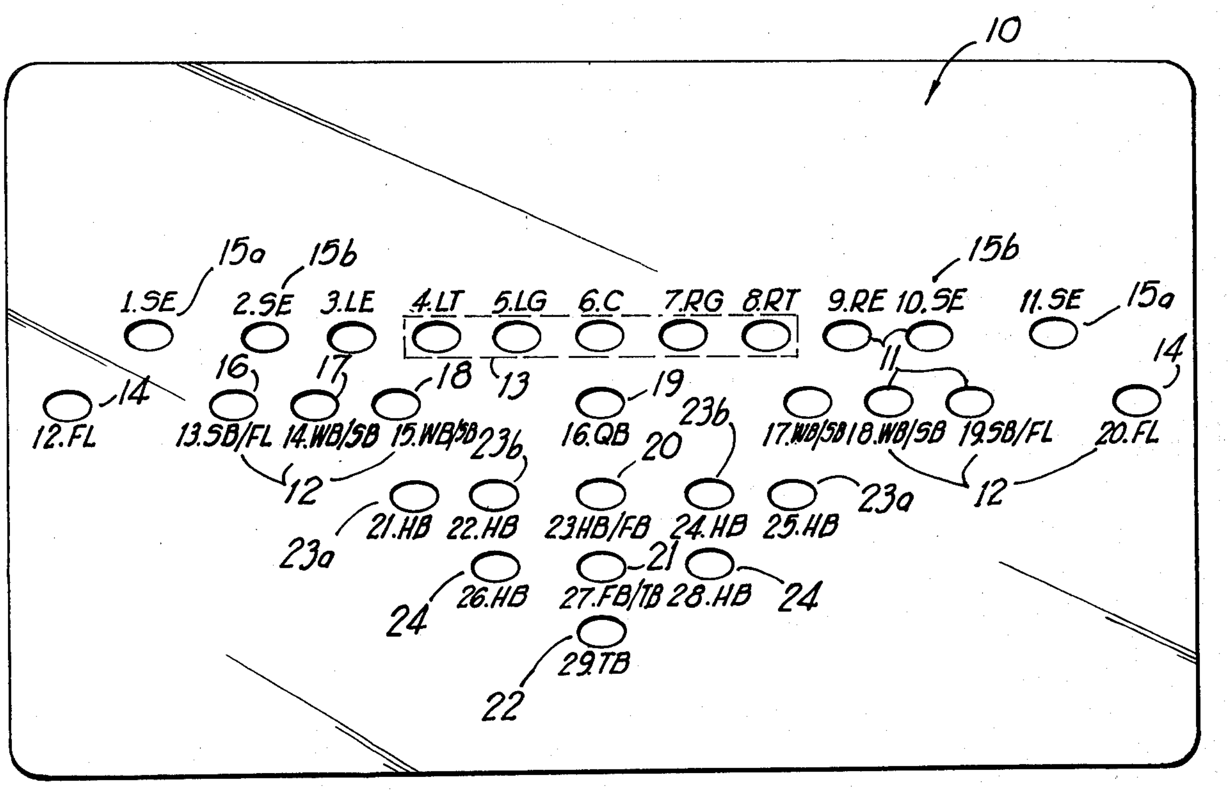
FIG. 1 is a plan view of a stencil for use in graphically illustrating offensive football formations.

Referring to the drawings in detail wherein like numerals designate like parts, a stencil 10 in accordance with the present invention is constructed from a single relatively thin preferably transparent stiff sheet of durable plastics material. Other materials could be employed in some cases, such as metal or fiberboard, but transparent plastics material is preferred. The stencil is substantially rectangular, as illustrated.

The stencil is provided with a multiplicity of preferably elliptical apertures 11 of a uniform size having their major elliptical axes parallel with the major axis of the rectangular stencil.

The elliptical apertures 11 are accurately positioned in the stencil to represent the proper positions of all conventional offensive football players at the beginning of offensive plays before any shifting or other movements.

Preferably, although not necessarily, the stencil 10 is marked with indicia 12 to indicate the reletive positions of particular offensive players. More particularly, in a front line of apertures 11 on the stencil, the down linemen, left tackle, left guard, center, right guard, and right tackle are indicated. Preferably, although not necessarily, these customary down linemen are enclosed in a visible boundary line 13 provided on the stencil. The front line of apertures 11 further includes the left and right ends, outside of the boundary line 13, and split ends 15*a* and 15*b* in their proper positions at the start of a play.

In a second line of apertures 11 behind the front line, two flankers are indicated at 14 at opposite ends of the second line somewhat outwardly of the two split ends 15*a* and *b* in the front line. Inwardly of the flankers and rearwardly of the front line between the split ends 15*a* and left and right tackles are split back/flankers 16 and wing back/split backs 17 and 18. The quarterback 19 is positioned in the second line immediately behind the center.

Behind the quarterback in a line perpendicular to the front line and second line of apertures 11, and perpendicular to the major axis of the stencil 10, are the halfback/fullback 20, fullback/tailback 21 and tailback 22. Four additional halfbacks 23*a* and 23*b* are spread laterally to the halfback/fullback 20 to form with such back a third line parallel to the front and second lines and perpendicular to the line perpendicular to the major axis of the stencil 10. The two halfbacks 23*a* are approximately behind the left and right tackles in the front line of players, while the two halfbacks 23*b* are approximately behind the left and right guards in the front line of players. Two more halfbacks 24 are spread laterally of the fullback 21 and form with such back a fourth line parallel to the front, second and third lines and also perpendicular to the line perpendicular to the major axis of the stencil 10. Halfbacks 24 are approximately behind the left and right guards in the front line of players. Alternatively, halfbacks 23*a* may be positioned approximately behind the left and right tackles as shown, but about halfway between the third parallel line containing halfback/fullback 20 and the fourth parallel line containing fullback/tailback 21.

The described arrangement of elliptical apertures 11 in the template 10 represents a true scalar positioning of all customary offensive football players with the players properly positioned at the beginning of any offensive play. For further convenience, the apertures 11 can be serially numbered "1" through "29" as shown in FIG. 1, if desired. In some cases, the stencil can be made without any printed indicia thereon.

Figure 2:
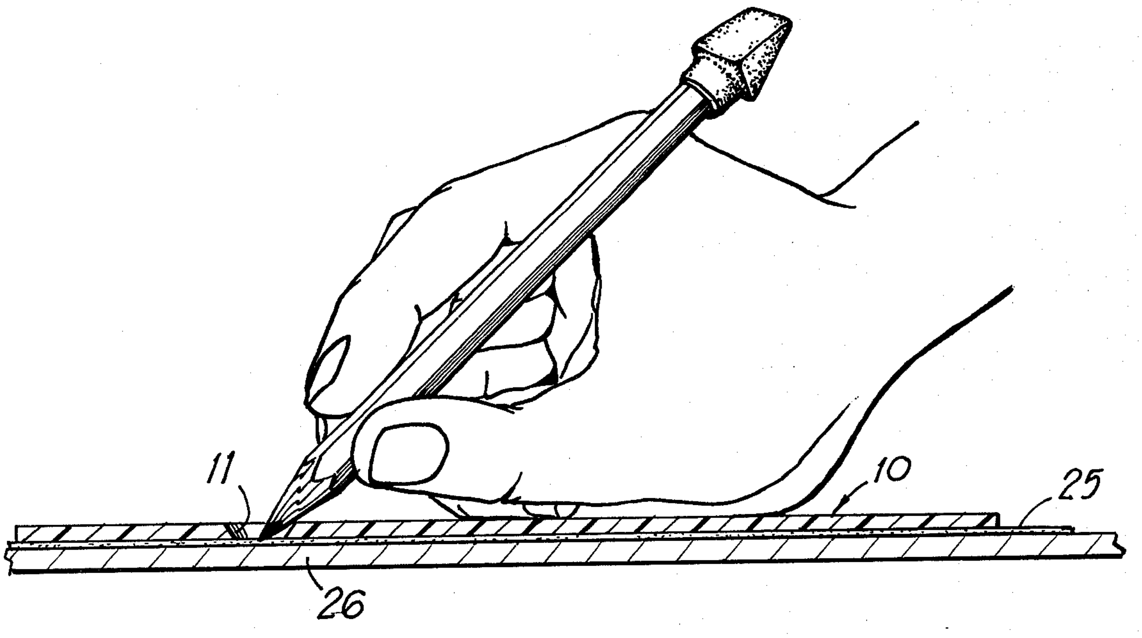
FIG. 2 is a side elevation illustrating the use of the stencil.

In use, FIG. 2, the stencil 10 is laid on a sheet of paper 25 with the paper on a suitable flat support surface 26, such as a clipboard. The particular chosen offensive formation is then drawn on the paper 25 by selecting seven apertures 11 in the front line and four additional apertures behind the front line, to make a total of eleven players. It may be understood that a wide variety of formations can be illustrated by means of the stencil by selecting different arrangements of the apertures 11, including the following convential formations with their variations: full T; wing T, double wing T; slot T, double slot T; short slot, wide slot; full I, slot I, power I; wishbone T; shot-gun; and, pro-set. Other offensive formations that are not customarily in use as much, such as the single wing and short punt as well as the special formations used in the punt, extra point and field goal, can be drawn with minor adjustments. The different possible variations of the seven basic formations outlined above are numerous.

For any chosen formation, a writing instrument such as a pencil is used to suitably mark on the paper 25 through the eleven chosen apertures 11 to depict the proper relative positions of eleven players at the beginning of any offensive play. The stencil 10 is then removed from the paper and a system of lines with arrows, numbers and other desired indicia can be marked on the paper 25 to illustrate movements of players in the particular offensive play to the completion of the play, commonly known as "diagraming" the play. The resulting diagramed offensive play can then be duplicated and can be included in a team's playbook.

The convenience, accuracy and versatility of the football stencil and its many advantages over customary practice should now be apparent to those skilled in the art. The device is extremely simple, unitary and durable. It is very inexpensive to manufacture. Of course, the size of the stencil can be adjusted to suit all popular sizes of diagramed offensive formations.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A football stencil for use in the graphic illustration on a substrate of various offensive football formations with the football players in proper positions at the beginning of offensive plays, comprising a flat stencil body of sheet material having formed therethrough a multiplicity of apertures positioned in spaced relationship in the stencil body and being representative of all of the customary offensive football players in their proper positions at the beginning of any offensive play, said stencil containing a sufficient number of apertures so arranged as to allow any one of a number of different offensive alignments to be selectively drawn, whereby a writing instrument can be employed through eleven selected apertures of the stencil body to graphically illustrate on the substrate the particular offensive football formation selected.

2. A football stencil as defined in claim 1, wherein the stencil body is formed of transparent plastics material.

3. A football stencil for use in the graphic illustration on a substrate of various offensive football formations with the football players in proper positions at the beginning of offensive plays, comprising a flat stencil body of sheet material having formed therethrough a multiplicity of apertures positioned in spaced relationship in the stencil body and being representative of all of the customary offensive football players in their proper positions at the beginning of any offensive play, wherein the apertures in the stencil are arranged in first and second parallel lines and a center line perpendicular to the first and second lines, and a third parallel line across and perpendicular to the first-named perpendicular line, whereby a writing instrument can be employed through eleven selected apertures of the stencil body to graphically illustrate on the substrate any one of a number of particular offensive football formations.

4. A football stencil as defined in claim 3, and offensive player designating readable indicia on the stencil body adjacent to said apertures.

5. A football stencil as defined in claim 3, and a fourth parallel line across and perpendicular to said first-named perpendicular line.

6. A football stencil as defined in claim 3, wherein all of the apertures are equal size elliptical apertures with their major axes parallel and extending longitudinally of the first and second parallel lines.

7. A football stencil as defined in claim 3, wherein the apertures are 29 in number and arrayed on the stencil body to accurately correspond to the relative positions of offensive football players at the beginning of various offensive plays.

* * * * *